United States Patent

Uegami et al.

[11] Patent Number: 6,157,153
[45] Date of Patent: Dec. 5, 2000

[54] MOTOR DRIVER

[75] Inventors: Tomoaki Uegami, Kyoto; Takahiro Sakaguchi, Musashino, both of Japan

[73] Assignees: Rohm Co., Ltd., Kyoto; Teac Corporation, Tokyo, both of Japan

[21] Appl. No.: 09/288,637

[22] Filed: Apr. 9, 1999

[30] Foreign Application Priority Data

Apr. 10, 1998 [JP] Japan ................................. 10-098741

[51] Int. Cl.[7] .............................. H02P 3/00; H02P 5/04; H02P 7/04
[52] U.S. Cl. ......................... 318/364; 318/365; 318/366; 318/450; 318/453; 318/375; 318/269; 318/272; 318/759; 360/74.1; 369/234; 369/235; 369/268
[58] Field of Search ..................... 318/364, 365, 318/366, 449, 450, 452, 453, 757, 758, 759, 375, 376, 269, 272; 360/74.1; 369/234, 235, 268

[56] References Cited

U.S. PATENT DOCUMENTS

| 4,658,308 | 4/1987 | Sander, Jr. ............................. 360/74.1 |
| 4,839,754 | 6/1989 | Gami et al. ........................... 360/73.01 |
| 4,862,052 | 8/1989 | Unsworth et al. ...................... 318/757 |
| 5,371,635 | 12/1994 | Sakaguchi et al. ................... 360/73.03 |
| 5,587,640 | 12/1996 | Ek et al. ................................. 318/638 |
| 5,715,157 | 2/1998 | Kuhn ......................................... 369/50 |
| 5,874,817 | 2/1999 | Yashita et al. .......................... 318/439 |

*Primary Examiner*—Robert E. Nappi
*Assistant Examiner*—Edgardo San Martin
*Attorney, Agent, or Firm*—Arent Fox Kintner Plotkin & Kahn PLLC

[57] ABSTRACT

A motor driver has a braking control circuit. The braking control circuit shuts off the supply of an electric current to the coils included in the motor when a motor control signal shifts to a predetermined level and, after a predetermined length of time secured in accordance with an index signal, starts application of braking to the rotation of the motor by the use of a braking circuit. The index signal is obtained from the signal that indicates the rotational position of the motor. The motor control signal is fed from a control signal generating circuit to the braking control circuit.

14 Claims, 6 Drawing Sheets

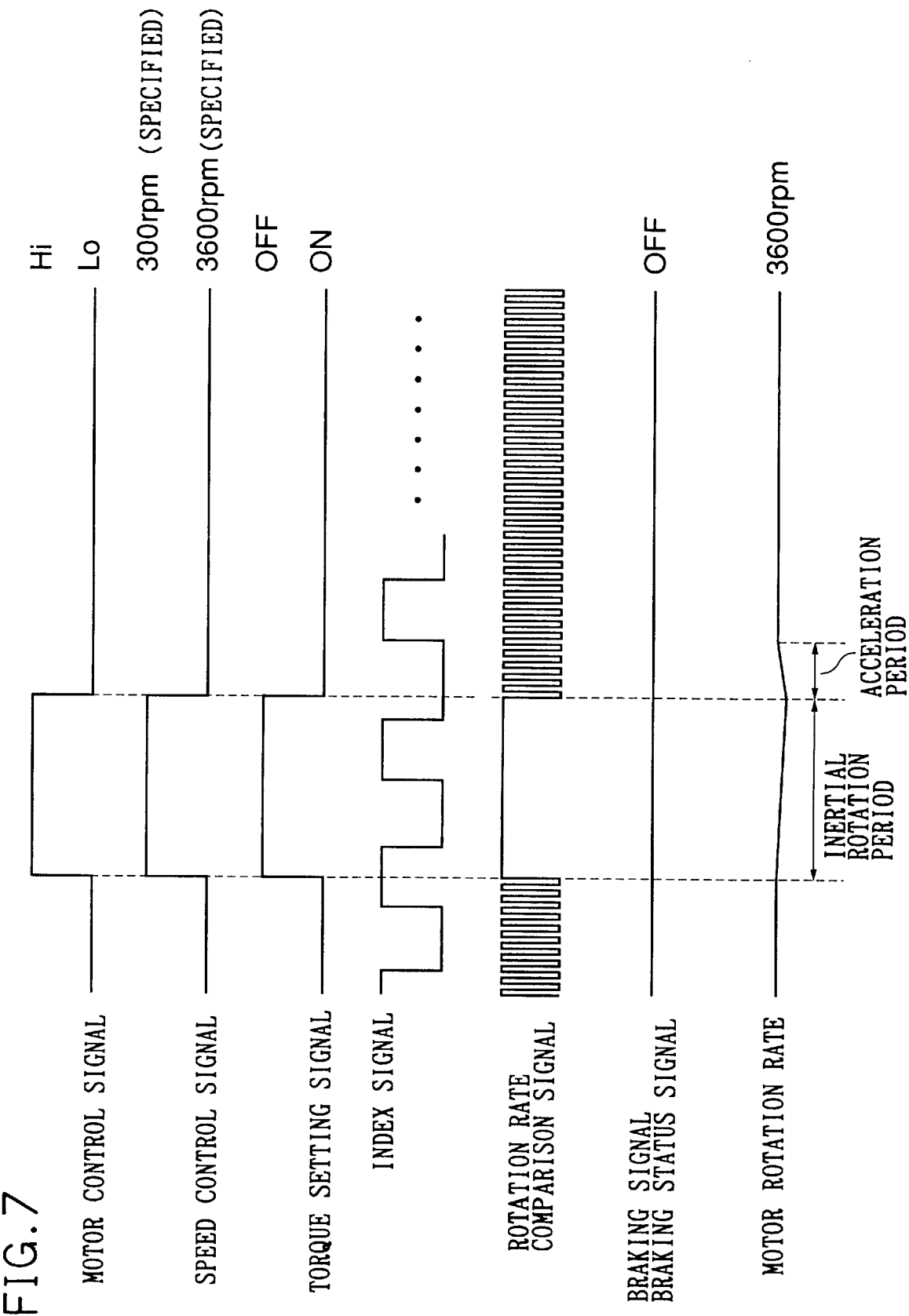

MOTOR DRIVER

BACKGROUND OF THE INVENTION

1. Field of the Invention

The present invention relates to a motor driver for driving a spindle motor for use in, for example, an FD (floppy disk) drive apparatus, and particularly to a motor driver having a braking system for applying braking to the rotation of a motor.

2. Description of the Prior Art

Conventionally, a motor driver for driving a spindle motor for use in a CD-ROM drive apparatus or for driving a capstan for use in a magnetic tape drive mechanism has a braking system for applying braking to the rotation of the motor. Now, how braking is applied to the rotation of a motor will be described with reference to FIG. 2.

First, both of the upper and lower power transistors TU and TL Sconstituting each of three pairs of power transistors connected in series between the supply voltage $V_{CC}$ and the reference voltage GND are turned off. As a result. the supply of electric currents to the three coils U, V, and W provided one for each phase in the motor is shut off. Then, in each pair, the upper power transistor TU (i.e. the one arranged on the higher-potential side) is turned off and the lower power transistor TL (i.e. the one arranged on the lower-potential side) is turned on, or alternatively the upper power transistor TU is turned on and the lower power transistor TL is turned off. As a result, braking is applied to the rotation of the motor.

However, in a conventional braking system, braking starts being applied immediately after the supply of electric currents has been shut off. In this system, if the electric currents are shut off when the upper power transistor TU is on and the lower power transistor TL is off, there is a possibility that the upper and lower power transistors TU and TL are turned on simultaneously. This may lead to destruction of a circuit element or to malfunctioning of a related circuit.

Moreover, no conventional motor driver is designed to release braking automatically even when the rotation rate of the motor drops down to a predetermined rate after braking has started being applied to the rotation of the motor. This makes it necessary to control the operation of the motor driver by the use of a control circuit that can monitor the rotation rate of the motor so that, when the rotation rate drops down to a predetermined rate, the motor driver will be fed with an instruction that requests releasing of braking. This makes the burden on the control circuit heavier.

Moreover, a conventional motor driver is designed to activate a braking system simply in response to a control signal that requests its activation, and thus is not equipped to prevent malfunctioning of the braking system. This makes it necessary to design the control circuit to manage strictly the control signal fed to the motor driver in order to prevent malfunctioning of the braking system that belongs to the motor driver. This makes the burden on the control circuit even heavier.

Moreover, in a conventional FD drive apparatus, a spindle motor is driven by the use of a motor driver that does not have a braking system. This is because, in a conventional FD drive apparatus, where the spindle motor is rotated at 360 rpm for high-rate rotation and at 300 rpm for low-rate rotation, the difference between the rates for high and low rotation is small, and therefore deceleration from the high rate to the low rate can be achieved simply by inertial rotation, i.e. without using any braking system. However, in a recently developed high-capacity FD drive apparatus, where the spindle motor is rotated at 3600 rpm for high-rate rotation and at 300 rpm for low-rate rotation, deceleration from the high rate to the low rate takes too much time if attempted simply by inertial rotation, and therefore a braking system is indispensable.

SUMMARY OF THE INVENTION

An object of the present invention is to provide a motor driver that is less likely to cause destruction of a circuit element or malfunctioning of a related circuit when braking is applied to the rotation of a motor.

Another object of the present invention is to provide a motor driver provided with a function for preventing malfunctioning of a braking system.

Another object of the present invention is to provide a motor driver that allows reduction of the burden on the circuit that controls it.

Another object of the present invention is to provide a motor driver for driving a spindle motor for use in a high-capacity FD drive apparatus that allows a braking system to be formed without any alteration in the other constituent circuits of a conventional FD drive apparatus.

A further object of the present invention is to provide a motor driver that consumes less electric power in the standby state.

To achieve the above objects, according to the present invention, a motor driver having a function for applying braking to the rotation of a motor is provided with: means for generating a braking command; means for shutting off the supply of an electric current to a coil included in the motor in response to the braking command; and means for starting application of braking to the rotation of the motor a predetermined length of time after the supply of the electric current is shut off. The motor driver may be further provided with control means for, while braking is being applied to the rotation of the motor, stopping application of braking to the rotation of the motor when the rotation rate of the motor becomes equal to a predetermined rate for low-rate rotation so that the rotation rate of the motor will thereafter be kept equal to the predetermined rate for low-rate rotation. In this case, preferably, after braking starts being applied to the rotation of the motor, the control means continues application of braking to the rotation of the motor until the rotation rate of the motor becomes equal to the predetermined rate for low-rate rotation. As a result, once braking starts being applied to the rotation of the motor, even if the control signal fed to the motor driver contains noise, the current state (applied or released) of braking against the rotation of the motor is not switched. This makes it possible to apply braking stably to the rotation of the motor.

Preferably, after the braking command is received and before application of braking to the rotation of the motor is started, if the braking command is canceled, the rotation rate of the motor is kept equal to a predetermined rate for high-rate rotation.

BRIEF DESCRIPTION OF THE DRAWINGS

This and other objects and features of the present invention will become clear from the following description, taken in conjunction with the preferred embodiments with reference to the accompanying drawings in which:

FIG. 7 is a timing chart showing how relevant signals change their levels when the motor control signal shifts from a high level to a low level before braking starts being applied to the rotation of the motor in the motor driver of the present invention.

DESCRIPTION OF THE PREFERRED EMBODIMENTS

Figure 1:
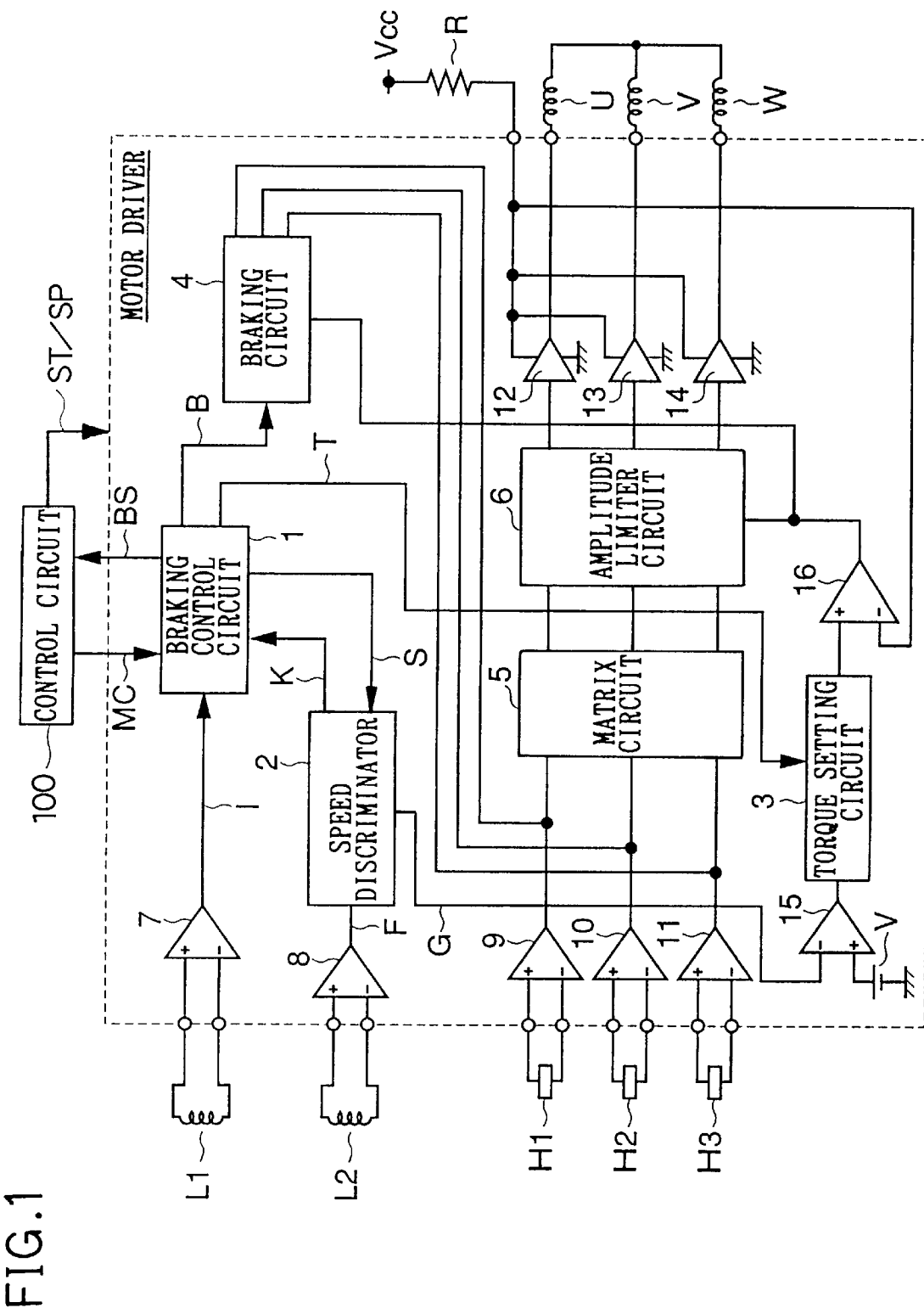
FIG. 1 is a block diagram of a motor driver embodying the invention.

Hereinafter, an embodiment of the present invention will be described with reference to the accompanying drawings. FIG. 1 shows, as one embodiment of the present invention, a block diagram of a motor driver for driving a spindle motor for use in a high-capacity FD drive apparatus. As shown in FIG. 1, in this motor driver, a braking control circuit 1, in accordance with a motor control signal MC fed thereto from a control circuit 100 provided separately from the motor driver to control the operation thereof, controls a speed discriminator 2, a torque setting circuit 3. and a braking circuit 4 (described in detail later) on the one hand, and feeds a braking status signal BS back to the control circuit 100, on the other hand.

Near the spindle motor is arranged a coil L1 for reference position detection, of which both ends are connected to the input terminals of an index comparator 7. The index comparator 7 outputs a signal I (hereafter referred to as the "index signal") in which one pulse appears every time the spindle motor makes one complete turn. The index signal I is fed to the braking control circuit 1.

Also arranged near the spindle motor is a coil L2 formed by a conducting pattern for rotation rate detection. This coil L2 generates a sine wave, which is converted by an FG comparator 8 into a square wave F (hereafter referred to as the "FG signal") and then fed to the speed discriminator 2.

Around the rotor of the spindle motor are arranged Hall-effect devices H1, H2, and H3, which are connected to the input terminals of amplifiers 9, 10, and 11, respectively. The three output signals from these amplifiers 9, 10, and 11 together indicate the rotational position of the spindle motor. The output signals of the amplifiers 9, 10, and 11 are, in a matrix circuit 5, individually subjected to a predetermined synthesizing process so that their respective phases are advanced by 30 degrees, and are then fed to an amplitude limiter circuit 6.

The amplitude limiter circuit 6 is fed also with an output current of a current-feedback amplifier 16, and distributes this current among the signals fed thereto from the matrix circuit 5 so as to adjust the amplitude of these signals before feeding them to drivers 12, 13, and 14.

Figure 2:
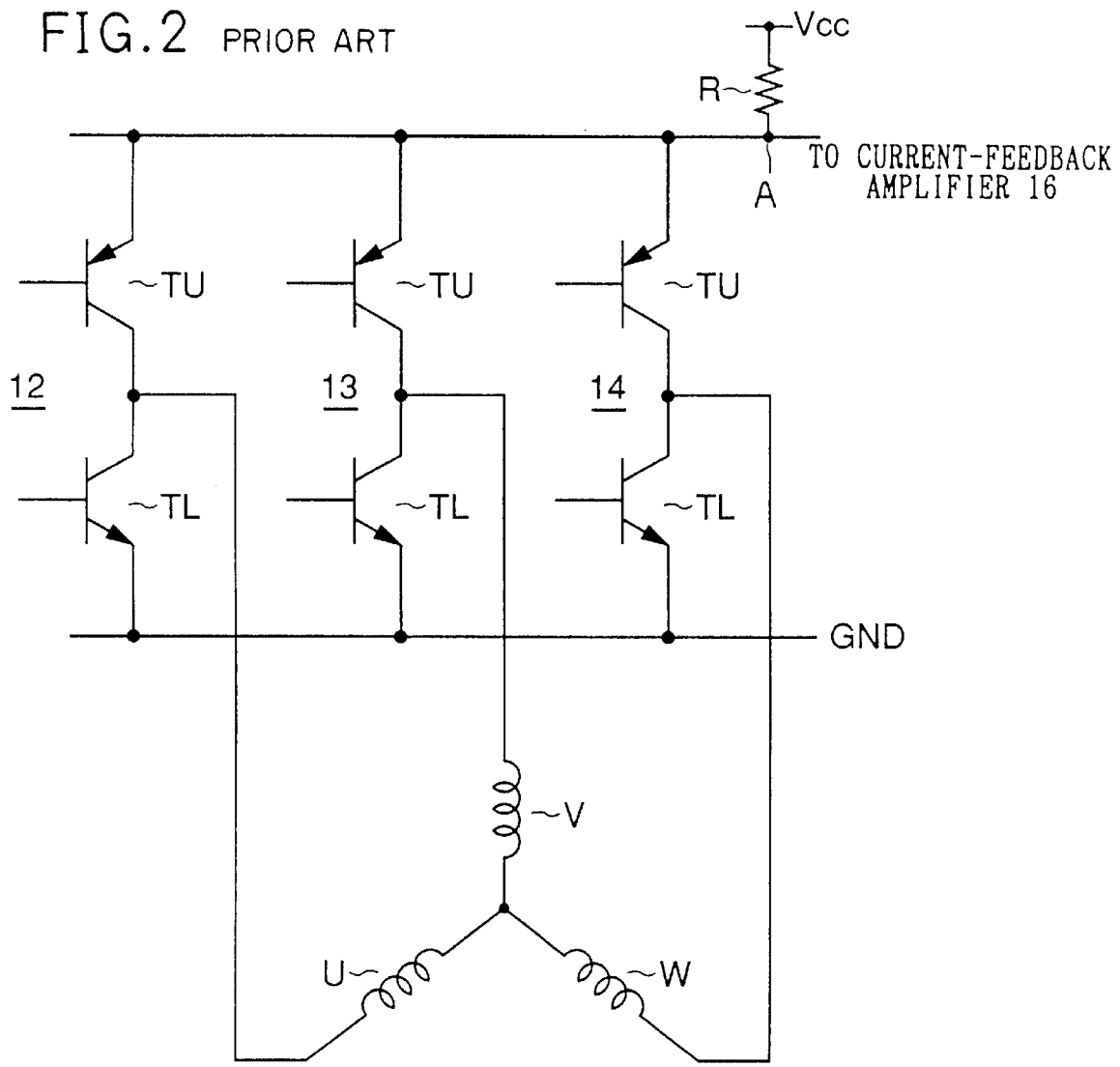
FIG. 2 is a diagram showing the output stage of the motor driver of the present invention.

The drivers 12, 13, and 14 boost the driving capacity of the signals from the matrix circuit 5 by a predetermined factor and then output them to the spindle motor to drive it. These drivers 12, 13, and 14 have output stages as shown in FIG. 2, where. for each driver, a PNP-type power transistor TU and an NPN-type power transistor TL are connected in series between the supply voltage $V_{CC}$ and the reference voltage GND so as to form a push-pull circuit. These two, upper and lower, transistors TU and TL are turned on or off in accordance with the signal fed from the amplitude limiting circuit 6. The drivers 12, 13. and 14 have the node between the two power transistors of their respective output stages connected to the coils U, V, and W, respectively, of the spindle motor. Note that, between the supply voltage $V_{CC}$ and the upper power transistor TU, a resistor R is connected so that feedback of the output current will be achieved by feeding the voltage across this resistor R to the current-feedback amplifier 16.

As a result, the currents fed to the coils U, V, and W are switched in an appropriate manner in accordance with the rotation position of the spindle motor so that the spindle motor will rotate most efficiently. The rotation rate of the spindle motor varies as follows. As the output current from the current-feedback amplifier 16 increases, the amplitude of the signals fed to the drivers 12, 13, and 14 increases. This causes the current capacity of their respective output stages, and thus the currents fed to the coils U, V, and W, to increase accordingly. Consequently, as long as the load is kept constant, the rotation rate of the spindle motor increases.

The frequency of the FG signal F varies according to the rotation rate of the spindle motor. On the basis of this FG signal F, the speed discriminator 2 monitors the rotation rate of the spindle motor, and controls the level of a rotation rate comparison signal K that it feeds to the braking control circuit 1 in accordance with the monitored rotation rate; specifically, if the rotation rate of the spindle motor is higher than the rate (hereafter referred to as the "specified rotation rate") specified by a speed control signal S fed from the braking control circuit 1, the rotation rate comparison signal K is kept at a high level, and, if the rotation rate of the spindle motor is lower, the rotation rate comparison signal K is made to oscillate between a high and a low level so as to be formed into a high-frequency signal.

In this embodiment, the specified rotation rate equals 300 rpm or 3600 rpm depending on whether the speed control signal S is at a high level or at a low level, respectively.

The speed discriminator 2 also outputs a rotation rate error signal G whose voltage varies according to the difference between the rotation rate of the spindle motor as monitored on the basis of the FG signal F and the specified rotation rate. This rotation rate error signal G is fed to the inverting terminal (−) of an error amplifier 15.

A constant voltage source V is connected to the non-inverting terminal (+) of the error amplifier 15. Thus, the output voltage of the error amplifier 15 increases as the rotation rate of the spindle motor increases, and the former decreases as the latter decreases.

The current-feedback amplifier 16 receives, at its non-inverting terminal (+) the output voltage of the error amplifier 15 through the torque setting circuit 3 and, at its inverting terminal (−), the voltage mentioned earlier that varies according to the output current. Thus, the current-feedback amplifier 16 outputs a current in accordance with the difference between the voltage fed to its non-inverting terminal (+) and the voltage fed to its inverting terminal (−).

Figure 3:
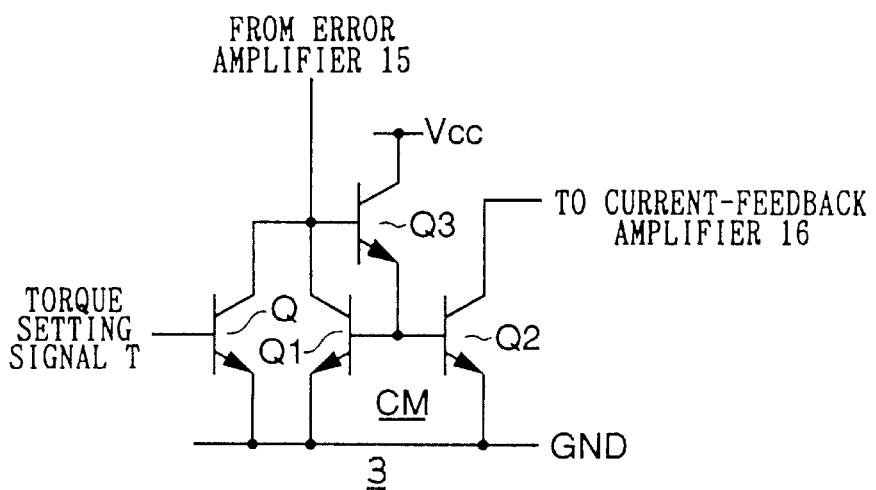
FIG. 3 is a diagram showing the configuration of the torque setting circuit in the motor driver of the present invention.

As shown in FIG. 3, the torque setting circuit 3 has a current mirror circuit CM composed of NPN-type transistors Q1, Q2, and Q3. Here, the collector of the input-stage transistor Q1 of the current mirror circuit CM is grounded through an NPN-type transistor Q, and this transistor Q receives, at its base, a torque setting signal T. The collector of the input-stage transistor Q1 of the current mirror circuit CM is connected to the output of the error amplifier 15, and the collector of the output-stage transistor Q2 is connected to the non-inverting input terminal (+) of the current-feedback amplifier 16.

Accordingly, when the torque setting signal T is at a low level, the output of the error amplifier 15 is fed to the current-feedback amplifier 16 so that the rotation rate of the spindle motor will be kept equal to the specified rotation rate (hereafter, this will be described as "the torque is turned on at the specified rotation rate"). By contrast, when the torque setting signal T turns to a high level, the output of the error amplifier 15 is shut off by the torque setting circuit 3. As a result, the output current of the current-feedback amplifier 16 reduces to zero, and the amplitude of the signals fed to the drivers 12, 13, and 14 reduced to zero. Consequently, the upper and lower power transistors in the output stages are both turned off, and thus the supply of electric currents to the coils U, V, and W is shut off (hereafter, this will be described as "the torque is turned off").

The braking circuit 4 receives a braking signal B from the braking control circuit 1. When the braking signal B is at a low level, the braking circuit 4 remains inactive. When the braking signal B turns to a high level, the currents from the outputs of the amplifiers 9, 10, and 11 flow into the braking circuit 4. Simultaneously, as will be described later, since the torque setting signal T is at a high level when the braking signal B is at a high level, and thus the output current of the current-feedback amplifier 16 is zero, the braking circuit 4 feeds a current to the amplitude limiter circuit 6 to make the amplitude of the signals fed to the drivers 12, 13, and 14 sufficiently large.

As a result, in the output stages of the drivers 12, 13, and 14, the upper transistor TU is held in the off state and the lower transistor TL is held in the on state. Consequently, the two ends of each of the coils of the spindle motor are short-circuited and thereby the electromotive force induced by the magnets and coils of the spindle motor is reduced. In this way, braking is applied to the rotation of the motor.

Figure 4:
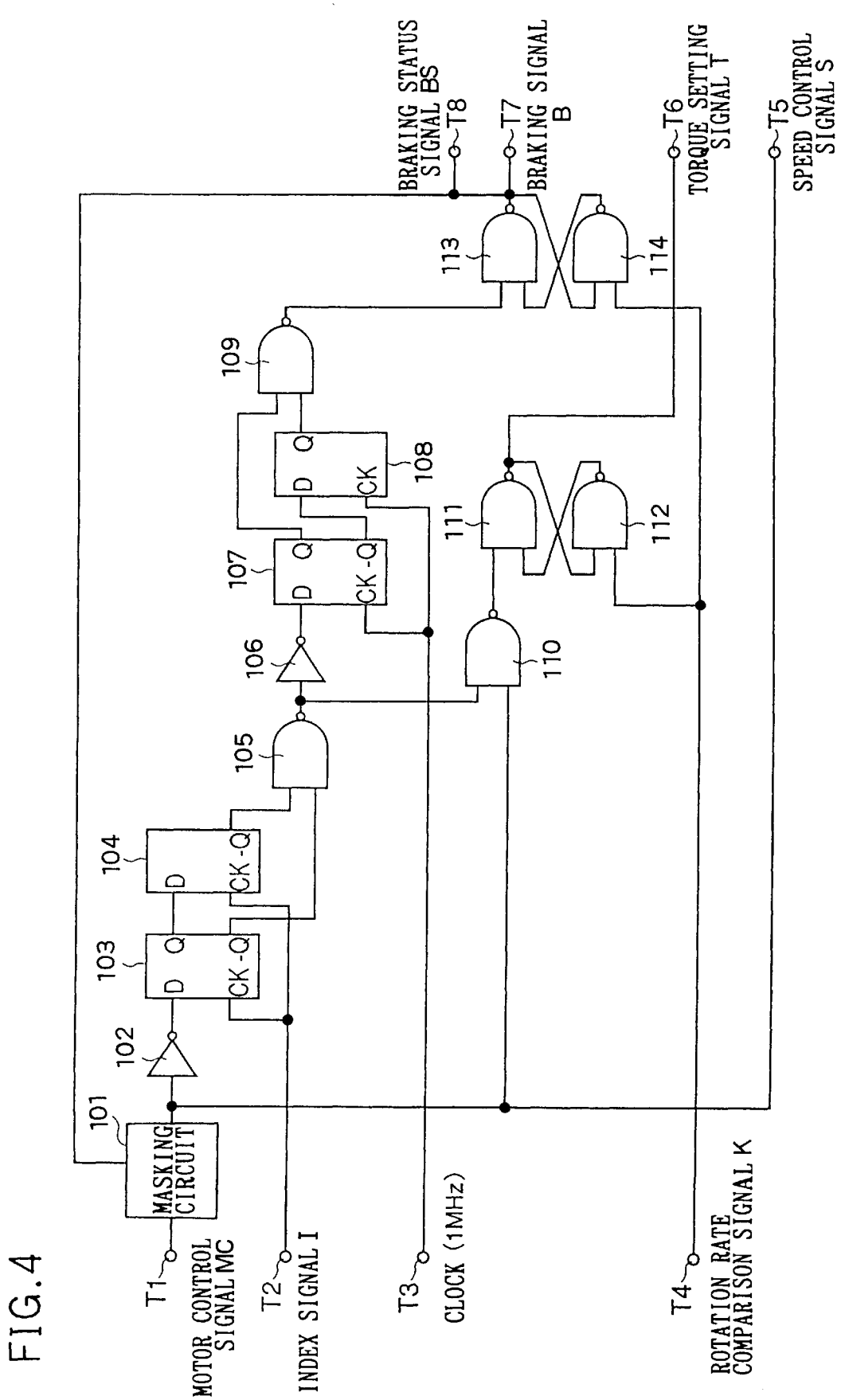
FIG. 4 is a diagram showing the configuration of the braking control circuit in the motor driver of the present invention.

FIG. 4 shows the configuration of the braking control circuit 1. As shown in FIG. 4, the braking control circuit 1 receives the motor control signal MC via a terminal T1. The motor control signal MC is then fed through a masking circuit 101 to an inverter circuit 102 and to a NAND circuit 110, and is also fed out as the speed control signal S via a terminal T5.

The masking circuit 101 also receives the output of another NAND circuit 113 described later. When the output of the NAND circuit 113 is at a low level, the masking circuit 101 outputs the motor control signal MC intact. By contrast, while the output of the NAND circuit 113 is at a high level, the masking circuit 101 does not accept the motor control signal MC, and holds its output as it is.

The output terminal of the inverter circuit 102 is connected to the data input terminal D of a D flip-flop 103. The output terminal Q of the D flip-flop 103 is connected to the data input terminal D of a D flip-flop 104. The inverted output terminals -Q of the D flip-flops 103 and 104 are connected to the input of a NAND circuit 105. The D flip-flops 103 and 104 receive, at their clock input terminals CK, the index signal I.

Thus, the output of the NAND circuit 105 turns from a high level to a low level at the rising edge of the second pulse in the index signal I after the motor control signal MC has turned from a low level to the high level.

The output of the NAND circuit 105 is fed to an inverter circuit 106 and to the NAiND circuit 110. The output terminal of the inverter circuit 106 is connected to the data input terminal D of a D flip-flop 107. The inverted output terminal -Q of the D flip-flop 107 is connected to the data input terminal D of a D flip-flop 108. The output terminals Q of the D flip-flops 107 and 108 are connected to the input of a NAND circuit 109. The D flip-flops 107 and 108 receive, at their clock input terminals CK, a high-frequency (1 MHz) external clock fed in via a terminal T3.

As a result, every time the input to the inverter circuit 106 turns from a high level to a low level, a one-shot low-level pulse appears in the output of the NAND circuit 109.

Two NAND circuits 111 and 112 are so connected as to form an RS latch, with the output terminal of each NAND circuit connected to one input terminal of the other NAND circuit. In addition, the other input terminal of the NAND circuit 11 is connected to the output terminal of the NAND circuit 110, and the other input terminal of the NAND circuit 112 is connected to a terminal T4, to which the rotation rate comparison signal K is fed. The output of the NAND circuit 111 is fed out as the torque setting signal T via a terminal T6.

As a result, when the output of the NAND circuit 110 turns to a high level and the rotation rate comparison signal K turns to a low level, the torque setting signal T turns to a low level, and, when the output of the NAND circuit 110 turns to a low level (with the rotation rate comparison signal K at a high level), the torque setting signal T turns to a high level. When the output of the NAND circuit 110 and the rotation rate comparison signal K both turn to a high level, the torque setting signal T remains as it is.

Two NAND circuits 113 and 114 are so connected as to form an RS latch. In addition, the other input terminal of the NAND circuit 113 is connected to the output of the NAND circuit 109, and the other input terminal of the NAND circuit 114 is connected to the terminal T4, to which the rotation rate comparison signal K is fed. The output of the NAND circuit 113 is fed out as the braking signal B and as the braking status signal BS via a terminal T7 and via a terminal T8, respectively, and is also fed to the masking circuit 101.

As a result, when the output of the NAND circuit 109 turns to a high level and the rotation rate comparison signal K turns to a low level, the braking signal B and the braking status signal BS turn to a low level, and, when the output of the NAND circuit 109 turns to a low level (with the rotation rate comparison signal K at a high level), the braking signal B and the braking status signal BS turn to a high level. When the output of the NAND circuit 109 and the rotation rate comparison signal K both turn to a high level, the braking signal B and the braking status signal BS remain as they are.

Figure 5:
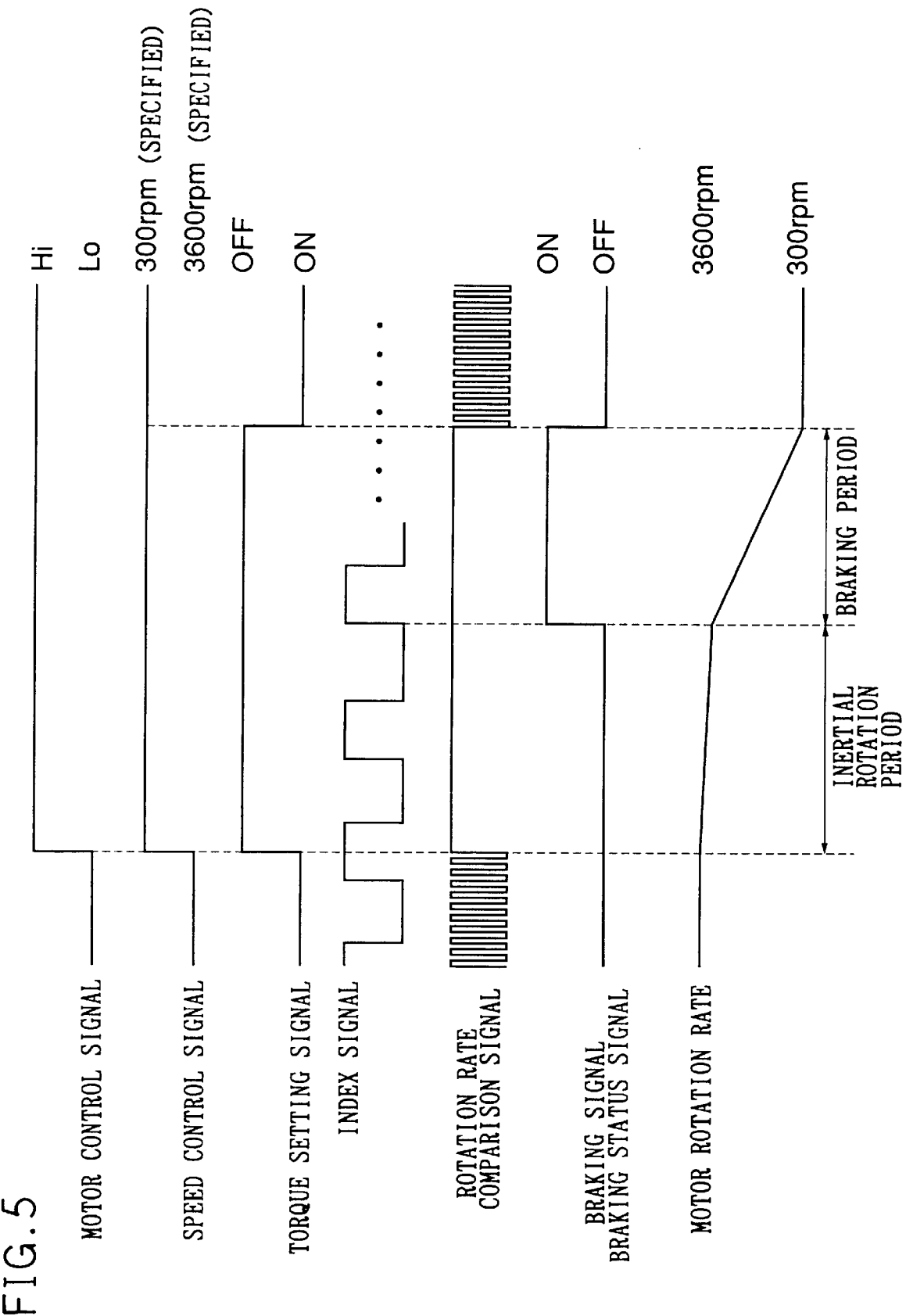
FIG. 5 is a timing chart showing how relevant signals change their levels when the motor control signal shifts from a low level to a high level in the motor driver of the present invention.

In short, as shown in FIG. 5 in the form of a timing chart of relevant signals, when the motor control signal MC turns from a low level to a high level, the speed control signal S turns to a high level. Since this causes the rotation rate comparison signal K to be kept at a high level, both inputs to the NAND circuit 110 are kept at a high level until the rising edge of the second pulse in the index signal I after the motor control signal MC has turned from a low level to a high level. Thus, the output of the NAND circuit 110 turns from a high level to a low level, and this makes the torque setting signal T turn from a low level to a high level.

Then, at the rising edge of the second pulse in the index signal I after the motor control signal MC has turned from a low level to a high level, a one-shot low level appears in the output of the NAND circuit 109. Since at this time the rotation rate comparison signal K is kept at a high level, the braking signal B and the braking status signal BS turn from a low level to a high level.

Thus, the motor driver as a whole operates as follows. When the motor control signal MC turns to a high level, the specified rotation rate is set at 300 rpm (this causes the rotation rate comparison signal K to be kept at a high level), and the torque is turned off. As a result, the spindle motor starts rotating by inertia, and thus its rotation rate starts decreasing gradually. Then, at the rising edge of the second pulse in the index signal I, braking is applied to the rotation of the spindle motor, and thus the rotation rate of the spindle motor starts decreasing faster than during inertial rotation.

When, as a result of braking being applied to the rotation of the spindle motor, the rotation rate of the spindle motor reduces to 300 rpm, then, in the braking control circuit 1, the rotation rate comparison signal K starts oscillating at a high frequency, a low-level signal appears, and at that time the outputs of the NAND circuits 110 and 109 are at a high level, with the result that the torque setting signal T, the braking signal B, and the braking status signal BS turn to a low level.

Accordingly, when, as a result of braking being applied to the rotation of the spindle motor, the rotation rate of the spindle motor reduces to 300 rpm, then the speed control signal S turns to a high level, i.e. the torque is turned on at the specified rotation rate of 300 rpm, and application of braking to the rotation of the spindle motor is stopped. Thus, the rotation rate of the spindle motor is thereafter kept stably at 300 rpm.

Moreover, the braking status signal BS turns to a low level, and thus the control circuit 100 recognizes the completion of application of braking to the rotation of the spindle motor and proceeds to the next control process. Specifically, in the embodiment under discussion, in a case where the spindle motor is going to be stopped completely, when the rotation rate of the spindle motor becomes equal to 300 rpm, the control circuit 100 turns the start/stop signal ST/SP to a high level to turn off the power to the motor driver and thereby stop the rotation of the spindle motor.

As described above, in this embodiment, in response to a braking command (i.e. when the motor control signal MC turns to a high level), the torque is turned off, and then, a predetermined length of time (the time after the receipt of the braking command until the rising edge of the second pulse in the index signal I) thereafter, braking is applied to the rotation of the spindle motor. In this way, it is possible to reduce the possibility of destruction of a circuit element or malfunctioning of a related circuit as may be caused when the upper and lower power transistors in the output stages are turned on simultaneously.

Moreover, when, as a result of braking being applied to the rotation of the spindle motor, the rotation rate of the spindle motor reduces to the specified rotation rate of 300 rpm, application of braking is automatically stopped so that the specified rotation rate will be maintained thereafter. This makes it possible to eliminate the need to feed an instruction to stop application of braking, and thereby reduce the burden on the control circuit 100 provided to control the motor driver.

Moreover, the braking status signal BS, which indicates whether braking is being applied to the rotation of the spindle motor or not, is fed to the control circuit 100. This enables the control circuit 100 to recognize the current operation status of the motor driver, and thereby makes it easier for the control circuit 100 to control the motor driver.

Figure 6:
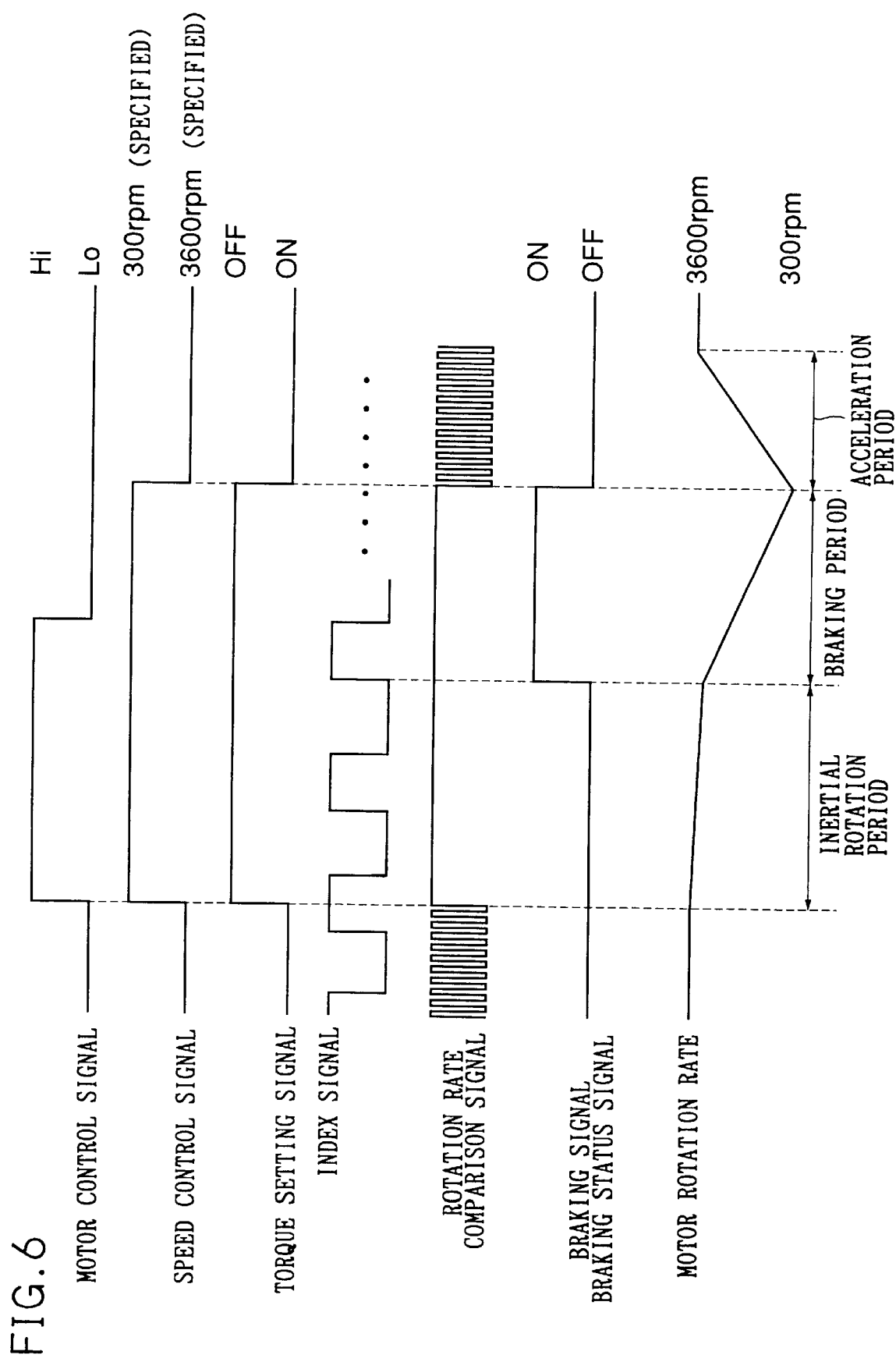
FIG. 6 is a timing chart showing how relevant signals change their levels when the motor control signal shifts from a high level to a low level after braking starts being applied to the rotation of the motor in the motor driver of the present invention.

As described above, when the motor control signal MC turns to a high level, a predetermined length of time thereafter, braking starts being applied to the rotation of the spindle motor. Now, consider a case where the motor control signal MC turns to a low level while braking is being applied to the rotation of the spindle motor (see FIG. 6).

In this case, in the braking control circuit 1, the output of the NAND circuit 113 (i.e. the braking signal B and the braking status signal BS) is at a high level, and therefore the masking circuit 101 does not accept the motor control signal MC, keeping its output at a high level. Accordingly, even if the motor control signal MC turns to a low level while braking is being applied, no change occurs in the output signal of the braking control circuit 1. As a result, application of braking to the rotation of the spindle motor is continued.

When the rotation rate of the spindle motor reduces to 300 rpm, the rotation rate comparison signal K starts oscillating at a high frequency, a low-level signal appears, and at that time the outputs of the NAND circuits 110 and 109 are at a high level. Thus, the torque setting signal T, the braking signal B, and the braking status signal BS turn to a low level. In response, the output of the masking circuit 101 turns to a low level, and thus the speed control signal S turns to a low level.

Accordingly, when the motor control signal MC turns to a low level while braking is being applied to the rotation of the spindle motor, application of braking is continued until the rotation rate of the spindle motor becomes equal to 300 rpm. Then, application of braking to the rotation of the spindle motor is stopped, and the torque is turned on at the specified rotation of 3600 rpm. Thus, the spindle motor is accelerated until its rotation rate reaches 3600 rpm, and thereafter the rotation rate of the spindle motor is kept stably at 3600 rpm.

In short, once braking starts being applied to the rotation of the spindle motor, application of braking is continued until the rotation rate reaches the specified rotation rate. Therefore, even if the motor control signal MC contains noise while braking is being applied, the current state (applied or released) of braking is not switched. This makes stable braking possible.

As described above, when the motor control signal MC turns to a high level, a predetermined length of time thereafter, braking starts being applied to the rotation of the motor. Now, consider a case where the motor control signal MC turns to a low level before braking starts being applied to the rotation of the motor (see FIG. 7).

In this case, in the braking control circuit 1, the output of the NAND circuit 113 (i.e. the braking signal B and the braking status signal BS) is at a low level. Therefore, the output of the masking circuit 101 turns to a low level, and the speed control signal S turns to a low level. As a result, the rotation rate comparison signal K starts oscillating at a high frequency, and the output of the masking circuit 101 turns to a low level. Now that one of the inputs to the NAND circuit 110 is no longer at a high level, the NAND circuit 110 outputs a high level, and thus the torque setting signal T turns to a low level.

That is, when the motor control signal MC turns to a low level before braking starts being applied to the rotation of the spindle motor, the torque is turned on at the specified rotation rate of 3600 rpm. As a result, since at this time the rotation rate has dropped a little due to inertial rotation, the spindle motor is accelerated until its rotation rate reaches 3600 rpm. Thereafter, the rotation rate of the spindle motor is kept stably at 3600 rpm.

Thus, even if the motor control signal MC contains noise that causes braking commands to be generated and canceled repeatedly, simply the torque is turned on and off repeatedly, and no braking is actually applied to the rotation of the spindle motor. In this way, it is possible to prevent malfunctioning of the braking system.

As described above, since the motor driver itself is provided with a function for preventing malfunctioning of the braking system, it is possible to simplify the way the control circuit 100 controls the motor control signal MC.

In a conventional FD drive apparatus, the control circuit 100 feeds the motor control signal MC and the start/stop signal ST/SP to a motor driver that has no braking system. By contrast, in this embodiment, these signals are used to control braking, and therefore, by adopting the motor driver of this embodiment, it is possible to form a braking system without any alteration in the other circuits constituting the FD drive apparatus.

Moreover, in this embodiment, in response to a braking command, to secure a predetermined length of time after the torque is turned off until braking starts being applied to the rotation of the spindle motor, the index signal I is used that has been used conventionally (the control circuit 100 reads and writes data in synchronism with the index signal I). This eliminates the need to externally feed or internally produce a new signal and provide a new terminal and a new circuit to handle it.

As described above, according to the above embodiment, in response to a braking command, the torque is turned off, and a predetermined length of time thereafter, braking starts being applied to the rotation of the spindle motor. Thus, it is possible to reduce the possibility of destruction of a circuit element or malfunctioning of a related circuit as may be caused when the upper and lower power transistors in the output stages are turned on simultaneously to apply braking to the rotation of the spindle motor.

Moreover, when, as a result of braking being applied to the rotation of the spindle motor, the rotation rate of the spindle motor reduces to the specified rotation rate for low-rate rotation, application of braking is automatically stopped so that the currently specified rotation rate is maintained. This makes it possible to reduce the burden on the circuit that is provided to control the motor driver.

Moreover, once braking starts being applied to the rotation of the spindle motor, application of braking is continued until the specified rotation rate is reached. Therefore, even if the motor control signal MC contains noise while braking is being applied, the current state (applied or released) of braking is not switched. This makes stable braking possible.

Moreover, even if noise or the like causes braking commands to be generated and canceled repeatedly after the receipt of a braking command before braking starts being applied to the rotation of the spindle motor, no braking is actually applied to the rotation of the spindle motor. Moreover, unless a braking command is maintained at least for a predetermined length of time, no braking is applied to the rotation of the spindle motor. This helps prevent malfunctioning of the braking system. Moreover, in the circuit provided to control the motor driver, it is possible to simplify the way the control signal to be fed to the motor driver is controlled, and thereby reduce the burden on this circuit.

Moreover, a means is provided for feeding out the braking status signal that indicates whether braking is being applied to the rotation of the spindle motor or not. Thus, by the use of this braking status signal, the circuit provided to control the motor driver can recognize the operation status of the motor driver, and thereby control the motor driver with more ease.

Moreover, it is possible to control operations by the use of a control signal that has been used conventionally. Thus, it is possible to form a braking system without any alteration in the other circuits constituting an FD drive apparatus. Moreover, in response to a braking command, to secure a predetermined length of time after the torque is turned off until braking starts being applied to the rotation of the spindle motor, there is no need to externally feed or internally produce a new signal and thus there is no need to provide a new terminal and a new circuit to handle it.

Moreover, a system incorporating the motor driver can be so designed that, when the rotation rate of the spindle motor is equal to the specified rate for lowrate rotation, the power to the motor driver is turned off by the start/stop signal and thereby the rotation of the spindle motor is stopped. This helps reduce power consumption in the stand-by state.

What is claimed is:

1. A motor driver having a function for applying braking to rotation of a motor, comprising:

means for generating a braking command;

means for shutting off supply of an electric current to a coil included in the motor in response to the braking command;

means for starting application of braking to rotation of the motor a predetermined length of time after the supply of the electric current is shut off; and control means for, while braking is being applied to the rotation of the motor, stopping application of braking to the rotation of the motor when a rotation rate of the motor becomes equal to a predetermined rate for low-rate rotation so that the rotation rate of the motor will thereafter be kept equal to the predetermined rate for low-rate rotation.

2. A motor driver as claimed in claim 1, wherein, after braking starts being applied to the rotation of the motor, the control means continues application of braking to the rotation of the motor until the rotation rate of the motor becomes equal to the predetermined rate for low-rate rotation.

3. A motor driver as claimed in claim 2, wherein the control means, after receiving the braking command and before starting application of braking to the rotation of the motor, upon cancellation of the raking command keeps the rotation rate of the motor equal to a predetermined rate for high-rate rotation.

4. A motor driver as claimed in claim 1, further comprising:

means for feeding out a braking status signal indicating whether braking is currently being applied to the rotation of the motor or not.

5. A motor driver as claimed in claim 1, further comprising:

means for turning off power to the motor driver in accordance with a start/stop signal fed in from outside.

6. A motor driver for driving a spindle motor for use in a floppy disk drive apparatus, comprising:

means for generating a braking command;

means for shutting off supply of an electric current to a coil included in the motor in response to the braking command;

means for starting application of braking to the rotation of the motor a predetermined length of time after the supply of the electric current is shut off; and means for generating, by using an index signal indicating that the spindle motor has made one complete turn, a predetermined length of time secured, in response to the braking commend, after the supply of the electric current is shut off before braking starts being applied to the rotation of the motor.

7. A motor driver as claimed in claim 6, further comprising:

control means for, while braking is being applied to the rotation of the motor, stopping application of braking to the rotation of the motor when a rotation rate of the motor becomes equal to a predetermined rate for low-rate rotation so that the rotation rate of the motor will thereafter be kept equal to the predetermined rate for low-rate rotation.

8. A motor driver as claimed in claim 7, wherein, after braking starts being applied to the rotation of the motor, the control means continues application of braking to the rotation of the motor until the rotation rate of the motor becomes equal to the predetermined rate for low-rate rotation.

9. A motor driver as claimed in claim 8, wherein the control means, after receiving the braking command and before starting application of braking to the rotation of the motor, upon cancellation of the braking command keeps the rotation rate of the motor equal to a predetermined rate for high-rate rotation.

10. A motor driver as claimed in claim 6, further comprising:

means for feeding out a braking status signal indicating whether braking is currently being applied to the rotation of the motor or not.

11. A motor driver as claimed in claim 6, further comprising:

means for turning off power to the motor driver in accordance with a start/stop signal fed in from outside.

12. A motor driver comprising:

means for generating a motor control signal;

means for feeding a driving current to a motor;

means for generating an index signal obtained from means for monitoring a rotational position of the motor;

a braking circuit for applying braking to rotation of the motor; and a braking control circuit that shuts off supply of the driving current to the motor when the motor control signal shifts to a predetermined level and that, after a predetermined length of time secured in accordance with the index signal, starts application of braking to the rotation of the motor.

13. A motor braking apparatus as claimed in claim 12, wherein, while braking is being applied to the rotation of the motor, application of braking to the rotation of the motor is stopped when a rotation rate of the motor becomes equal to a predetermined rate for low-rate rotation so that the rotation rate of the motor will thereafter be kept equal to the predetermined rate for low-rate rotation.

14. A motor braking apparatus as claimed claim 13, wherein, after braking starts being applied to the rotation of the motor, application of braking to the rotation of the motor is continued until the rotation rate of the motor becomes equal to the predetermined rate for low-rate rotation.

* * * * *